United States Patent [19]
Vavrek

[11] Patent Number: 5,261,350
[45] Date of Patent: Nov. 16, 1993

[54] DWELLING ADDITION PET ENCLOSURE

[76] Inventor: Dennis J. Vavrek, P.O. Box 7734, San Diego, Calif. 92167

[21] Appl. No.: 786,882

[22] Filed: Nov. 1, 1991

[51] Int. Cl.⁵ .............................................. A01K 1/03
[52] U.S. Cl. ...................................... 119/19; 119/165
[58] Field of Search ................ 119/19, 15, 161, 165, 119/166, 170

[56] References Cited

U.S. PATENT DOCUMENTS

| | | | |
|---|---|---|---|
| D. 317,216 | 5/1991 | Cutrone | 119/19 X |
| 2,932,279 | 4/1960 | Giles | 119/19 |
| 4,021,975 | 5/1977 | Calkins | 119/19 |
| 4,291,645 | 9/1981 | Cruchelow et al. | 119/19 |
| 4,299,190 | 11/1981 | Rhodes | 119/170 |
| 4,327,667 | 5/1982 | Bilak | 119/166 |
| 4,445,459 | 5/1984 | Sulie | 119/19 |
| 4,788,934 | 12/1988 | Fetter | 119/19 |
| 4,886,014 | 12/1989 | Sheriff | 119/166 |
| 4,989,546 | 2/1991 | Cannaday | 119/19 |
| 5,010,848 | 4/1991 | Rankin | 119/19 |

Primary Examiner—John G. Weiss
Assistant Examiner—Todd E. Manahan

[57] ABSTRACT

The present invention is a dwelling addition enclosure for protective outdoor containment of pets and other related contents, including a litter tray. The present invention comprises a system of an enclosure member, a seal, and a pair of cover plates, which are employed alternately of the enclosure member. More specifically, the enclosure member comprises a support boot having floor ventilation and an access opening, a security sleeve, a service access door, and an enclosure body and roof. When assembled as an enclosure member, the seal is positioned around a mounting sleeve part of the support boot. The support boot is installed within a dwelling wall service opening, fitting matingly with the security sleeve which is secured from the interior; the combination of the two creating a service access area between the dwelling interior and the exteriorly disposed support boot. The enclosure body and roof are then releasably secured to the support boot and to one another; thereby, completing the enclosure member. Alternatively, upon de-installation of the enclosure member from the service opening, a pair of cover plates, in combination with the seal, encloses the service opening.

19 Claims, 6 Drawing Sheets

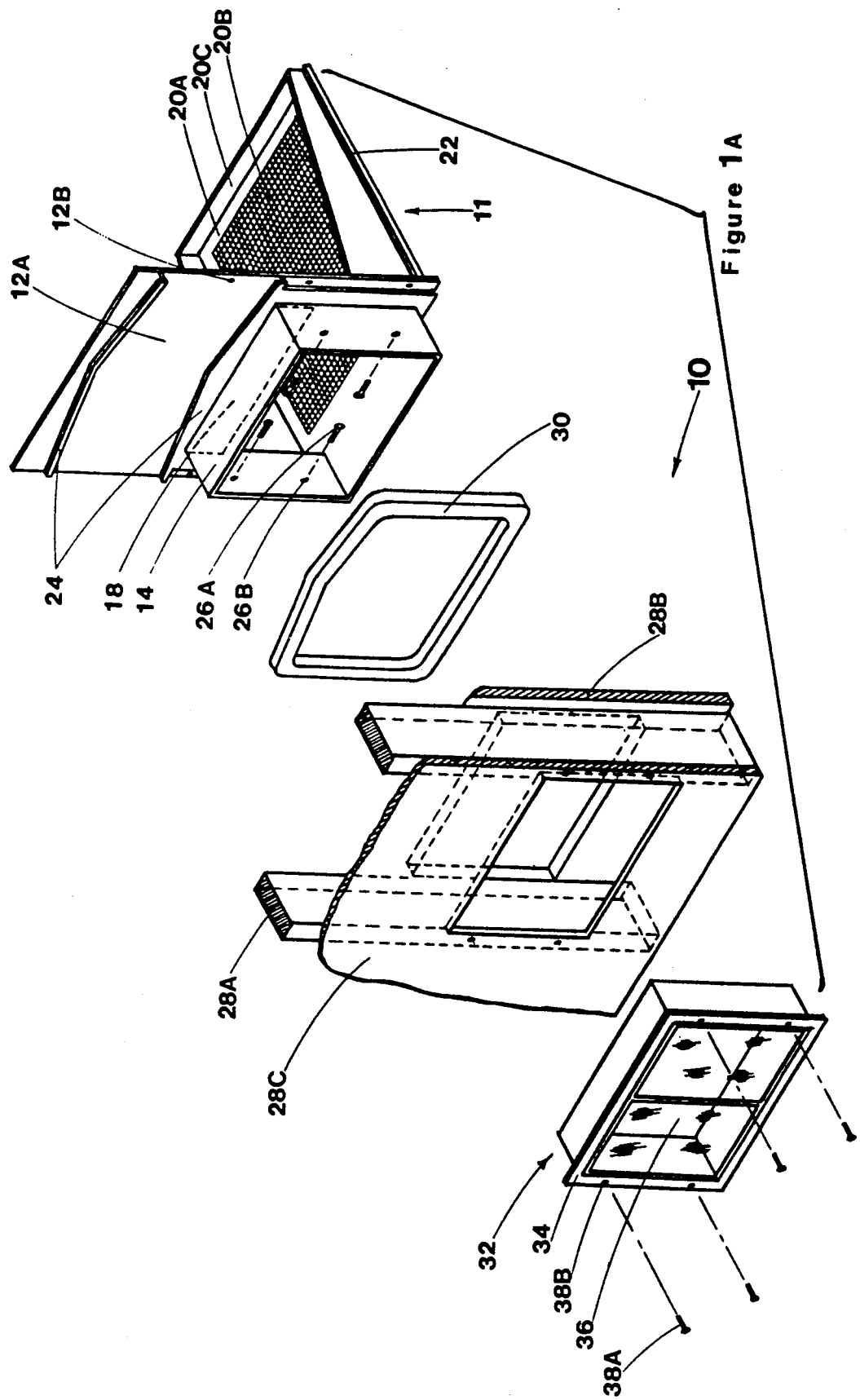

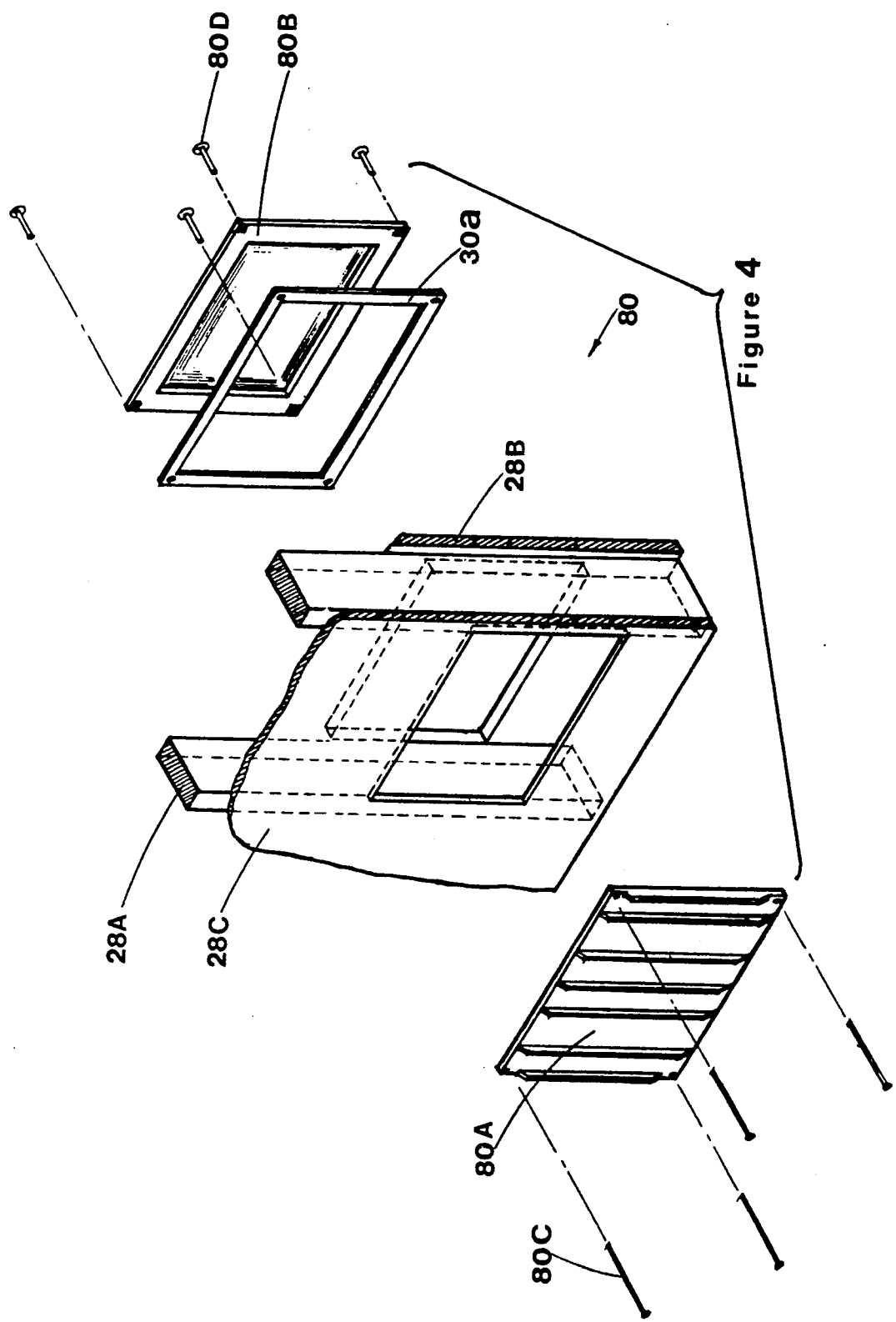

DWELLING ADDITION PET ENCLOSURE

BACKGROUND OF THE INVENTION

1. Field of Invention

The present invention relates to the field of devices which incorporates added space into a living area such as a house, so as to act as a generally contained area for use by a pet. More particularly, this invention relates to a pet enclosure attached to a living area which provides serviceable access and protective measures, including those of health, safety and security, to those affected areas of enclosure usage and of living area incorporation. Most particularly, this invention relates to a pet enclosure mounted within a service opening in a dwelling wall, window, or door which provides a designated, outdoor usage area for an indoor pet, including the placement and servicing of stored contents such as a litter tray.

2. Description of Prior Art

Owners of small animals, and especially cat owners, have in the past been supportive of various devices that attempt to mitigate the apparent inconveniences and disadvantages of owning indoor pets with the advantages of such relationship. Likewise, conscientious pet owners have attempted to adapt their own dwelling environments to make this shared living space as comfortable as is reasonably possible for both themselves and their pets. Pet owners are additionally confronted with the dilemma, on the one hand, to provide for the basic needs and instincts of their animals; and concurrently, to be mindful of an owner's responsibility to provide a safe and healthy environment in which both can congenially co-exist.

Heretofore, prior art devices directed at accomplishing these goals have been assorted and numerous. Various litter boxes and litter materials have been employed to dispose of indoor pet excrement. For example, a disposable cat litter system in U.S. Pat. No. 4,872,420, a drying litter box in U.S. Pat. No. 4,696,257, a disposable litter box in U.S. Pat. No. 4,627,382, a pet litter box with inner tray in U.S. Pat. No. 4,616,598, and a stacked arrangement of litter boxes in U.S. Pat. No. 4,271,787. All of these devices have the disadvantage of being located within the confines of the dwelling space whereby, the animal urine and feces odor is partially absorbed and dispersed into the dwelling space but still lingers therein.

Other pet owners prefer to install a pet door or hatch in a dwelling wall to allow free passage of the animal to excrete outdoors. Numerous configurations and examples of such devices have been patented. While satisfying one object, the disadvantages of these devices remains wherein, the animal can contract disease, unwanted mating, and injury in an uncontained outdoors. And further, due to current building development trends of high density and multiple story dwelling configurations, the practice of the pet excreting outdoors is progressively more likely to create offense by intruding on a neighbor's property and accordingly, less likely to be possible without ground floor access.

Many pet owners, although cognizant of the aforementioned problems which confront outdoor, free-roaming pets, and yet still feeling compelled to provide their animal with the outdoor experience, have employed various devices for intermittent outdoor containment. A plethora of detached pens and portable enclosures have been patented; and many, such as the family dog house and the cardboard box cat house, have simply prevailed in general use for an extended time. Although allowing the pet confined access to outside exposure, the problem with all previous outdoor enclosures is that they greatly limit the movement and accessibility of the pet and are generally supported by the ground; and thereby, their placement is limited and the protection they provide from other disruptive animals is diminished.

Thereafter, several enclosures were invented of the type which, in combination, incorporate a general enclosure provided with a pet door access. Animal shelters in U.S. Pat. No. 2,932,279 of giles and U.S. Pat. No. 3,738,322 of Smith both suggest enclosures comprised of substantially closed walls, mounted in an unsecured fashion in a wall opening, projecting interiorly of the dwelling, and provided with an access for an animal that is outside of the dwelling to obtain shelter within the confines therein. Summarily, these inventions have the limited capability to provide interior shelter for an outside animal while segregating the pet from the general dwelling area. More significantly, these devices do not integrate the general use areas of the animal with those of the owner.

Most recently, in the combination animal carrier and indoor-outdoor toilet in U.S. Pat. No. 4,029,048 of Gershbein, a device was invented that made an attempt to address one of the most undesirable aspects of indoor pet and owner cohabitation. More specifically, this device is a portable, box-like, generally enclosed litter tray holder. A typical installation of the proposed embodiment is that of placing the device in the considerably large opening of a vertically operated window with the box cantilevered exteriorly of the dwelling. This provides a space wherein a litter box is placed which attempts to contain the odors generated therein to an area that is generally disposed away from the dwelling living area.

With the Gershbein device, a number of critically essential ramifications necessary for functional success, and thereby widespread domestic application, are not contemplated. All of the prior art devices heretofore known, most specifically the Gershbein toilet, attempt to satisfy only myopic and partial solutions to this indoor-outdoor pet cohabitation arrangement; Therein, they suffer from a number of inherent shortcomings and disadvantages:

(a) The enclosure is constructed in an integral form of a generally consistent material and is installed in a cantilevered fashion; thus, the requisite strength, type, and thickness of the material of the entire structure is dictated by the critical load stresses placed on a few limited axes relative to the mounting means. Whereby, an over-encumbering type and excessive amount of material, which translates to increased product weight and cost, must be employed in its fabrication in order to structurally satisfy the installation and subsequent use of such a device. In addition, the term of the general use-life of an integrally constructed device is limited directly to the functional obsolescence or damage of any single part or area thereof.

(b) The inherent form and portable nature, respectively dictate that the device: (1) requires installation in an excessively large wall opening approximately equivalent to the longitudinal cross sectional area of the interior use area; and further, (2) requires a mounting means with an ease and quickness of installation and removal.

Given the present and futurely projected incidence of societal crime rates, a device that encourages and enhances the opportunity for dwelling intruder access, has limited chance of commercial acceptance or general usage. In addition, the substantial width and height of the requisite hole for device installation discourages the dwelling owner: (1) from structurally altering wall framing members; and further, (2) from defacing the dwelling wall surfaces in such a grand manner, whereby to necessitate expansive and disfiguring wall patch repair work in the event of device removal.

(c) The generally configured shape and suggested installation make no consideration and provide no accommodation for sealing and waterproofing the dwelling wall opening. Wherein, prior art enclosures contemplate the integral use of a dwelling wall as part of its operation, it is not generally functional without providing a protective means from inviting damage to its respective wall openings and, subsequently, to the adjacent dwelling space. Logic precludes the use of an invention that attempts to relieve one condition, litter box odor, only to exacerbate a more serious one, dwelling water damage.

(d) Although the Gershbein toilet enclosure provides for side wall vents and a circulating fan to diminish the odors generated therein, a problem exists wherein the critical importance of the general proportionate relation of combined wall, roof, and floor surface area to total ventilation surface area is specifically rejected; and, further rejected is the critical placements of the ventilation system. An additional critical condition is not contemplated wherein, means have not been included for the dispersement of undesirable heated air and increased air pressure inside of the enclosure. Specifically, floor ventilation is not contemplated. An enclosure of this type, with only side wall vents, provides a general cross air movement that has a limited capacity to disperse odor, accumulated heat, and increased air pressure. Furthermore, and equally as significant, this cross-ventilation has limited means of preventing a backdraft of offensive, odorous, hot or cold air from infiltrating back into the adjacent dwelling space. This backdrafting is a direct consequence of both heated air and increased air pressure; The latter being a consequence of ambient wind conditions entering and leaving the enclosures at an unequal rate; therein, creating a higher air pressure zone in the enclosure relative to the lesser air pressure zone of the adjacent dwelling space. Without a substantially open enclosure, unlike the aforementioned one that is substantially closed, these undesirable conditions can preclude the device's effective operation and use thereof. Notwithstanding, as substantiated by numerous cat behavior authorities, a cat will often refuse to approach a litter box area that is abundantly odorous, urine soaked, or unserviced.

(e) Means are not provided for preventing insects from invading the enclosure space through the ventilating means; thereby, causing possible health problems for the pet and subsequent infestation of the adjacent dwelling space. The contents of the litter tray will be a prime attraction to these insects and this device does not contemplate this health risk.

(f) The smallness of its portable size and the explicit function of toilet prohibits the use of the enclosure for general pet lounging and fails to provide the health enhancement advantages as a result thereof, both physical and psychological; whereby, the exposure to fresh air contributes to an animal's healthful coat and general well being.

Summarily, all prior art in this field have the common disadvantage of narrowly focusing on one device or another that provides an enclosed space for the pet, which also happens to be added to a living area. The present device has a more broadly focused context that provides for a protective added space, which is made a part of a living area. The disadvantageous general difference in the prior art is one of the apparent implication of an afterthought in consideration of the devices' integration within the general living areas. By comparison, the present invention provides equal forethought of consideration for the device being integration-sensitive within the affected living areas, as well as being operably-effective in the device's designated usage.

SUMMARY OF THE INVENTION

The present invention overcomes the shortcomings of the prior art by providing a pet addition enclosure for general outdoor containment which incorporates into a general living area in an architecturally sensitive and operably effective manner.

OBJECTS AND ADVANTAGES

Accordingly, several objects and advantages of the present invention are:

(a) to provide an animal enclosure which is comprised of a modular, componential assemblage that allows for each part to be fabricated of a configured form and of a distinctive material that is most appropriate to its function; and thereby, this enclosure economizes the material fabrication requirements and extends the use-life of the device by allowing for replacement of only worn or damaged components. Furthermore, the following unexpected objects advanced from these configured components are:

(b) to provide an animal enclosure which requires a minimal sized, dwelling wall service opening and alteration, and which has a service access area of such a nominal size that allows for comfortable and usable animal and contents passage through a closure means;

(c) to provide an animal enclosure which further includes an access opening comprised of a nominal area size which allows comfortable animal and contents passage therethrough and also, restrictively prohibits a security and safety breach of unwanted human access;

(d) to provide an animal enclosure having a service access area which is further comprised of a pair of mated components wherein, an exteriorly installed female component having attachment fasteners, fits matingly with an interiorly secured male component which protects against the disassembly of the former component, thereby providing a mounting that resists tampering by outside intruders and, additionally, is free of ground support;

(e) to provide an animal enclosure which comprises a planar front wall surface, in treble combination with both an accommodating positioning means for a sealing gasket and a dwelling wall surface;

(f) to provide an animal enclosure which is substantially open, including an abundance of both floor apertures and side wall apertures to allow for the rapid removal of excessive odors, heated air, and increased air pressure from within the enclosed space; and further, to cause outwardly directed convective air currents to occur. The substantial openings thereby ensure that unwanted conditions are preemptively dispersed outside of the enclosure prior to their conditional advancement back into the dwelling space through the enclosure service access area;

(g) to provide an animal enclosure which comprises ventilating apertures including a substantially open floor area, thus encouraging the rapid drying of moisture laden contents stored within the enclosure. This drying diminishes the propagation of unhealthy conditions, including urine and feces related infections, parasitic eggs, bacteria, and fungi;

(h) to provide an animal enclosure which has a substantially open floor area that allows for maximum circulation on and around a user's extremities therein, and thereby promotes a comfortable and healthful condition for the user;

(i) to provide an animal enclosure which protects the ventilating apertures from insect access;

(j) to provide an animal enclosure which has varied size and modular options to be readily adaptable for numerous animal functions by assorted types of animals, birds, and other vertebrates. Whereby, the cohabitation of a pet and an owner within a shared dwelling space is more congenially integrated.

Further objects and advantages are to provide an enclosure which is mounted externally of a dwelling; which permits free access thereinto from the interior of the dwelling; which is simple to use and inexpensive to manufacture; which can be installed in a professional manner within a wall, door, or window opening of most any type; which is made of a material that is durable enough to resist exposure to outside elements including ultra-violet rays, rain, and wind; which is made of a material that is washable and can tolerate the regular use of assorted disinfecting agents; which has an access opening for servicing its interior from both inside and outside the dwelling; which provides for ease of cleaning while the device remains in the installed position wherein, a substantially open floor allows for rapid water drainage and drying; which provides a portion of the enclosure to be of a nominal width to adequately fit between, and easily mount to, standardly spaced wall studs of an approximate spacing of 37 cm with no infringement on structurally calculated wall loads; which provides a comfortable exposure to outside air through the generous deployment of partially open walls and floor, and roof in some instances; which provides integral trim and therein, provides a ready and immediate finished appearance around all interior and exterior wall opening penetration surfaces; which diverts outside water elements from draining interiorly of the dwelling wall opening at the area where the enclosure penetrates the wall; which provides components that are easily assembled while minimalizing the use of potentially corrosive connective hardware; which has wall and roof surfaces that comprise a series of integrally molded protrusions which form a structural configuration that provides these solid surface areas with both an attractive design and also an increased strength with an economized use of material; which diverts water at surfaces where dissimilar, exteriorly exposed components adjoin; which has mated fitting components that integrally finish and enclose the interior surfaces and areas of dwelling wall penetration openings of varying thickness; which accommodates finished cover plates to enclose and secure dwelling wall opening in the event of device non-use or winterization; which provides a method for attaching the enclosure with no structural disturbance to and a minimal aesthetic defacement of the respective dwelling wall members and exposed wall surfaces; which provides an efficient means of mounting device to a secured window panel within a window frame opening of any configuration, including horizontally sliding windows and doors, wherein the weight of the mounted device can be transferred to the window panel over an expanded area greater than the immediate circumferenced area of the device penetration opening and thereby, minimizes the requisite strength and cost of the window panel.

These objects and advantages, as well as others, will be apparent from the more detailed description of the preferred embodiment below and from the drawings.

BRIEF DESCRIPTION OF THE DRAWINGS

In the drawings, closely related figures have the same number but different alphabetical suffixes.

Additionally in the drawings, for purposes of representational clarity, any and all squared, right angled surface configurations shown, are intended to be rounded and radiused to a degree that is most suited to functional and fabrication effectiveness.

FIG. 1A shows an isometric assembly of a support boot and a security sleeve, viewed from a dwelling interior, illustrative of an enclosure installation in a typical wall opening.

FIG. 4 shows an isometric assembly, viewed from a dwelling interior, of a pair of cover plates for a secured method of sealing a service opening wherefrom an enclosure has been de-installed.

BEST MODE FOR CARRYING OUT THE INVENTION

Figure 1B:
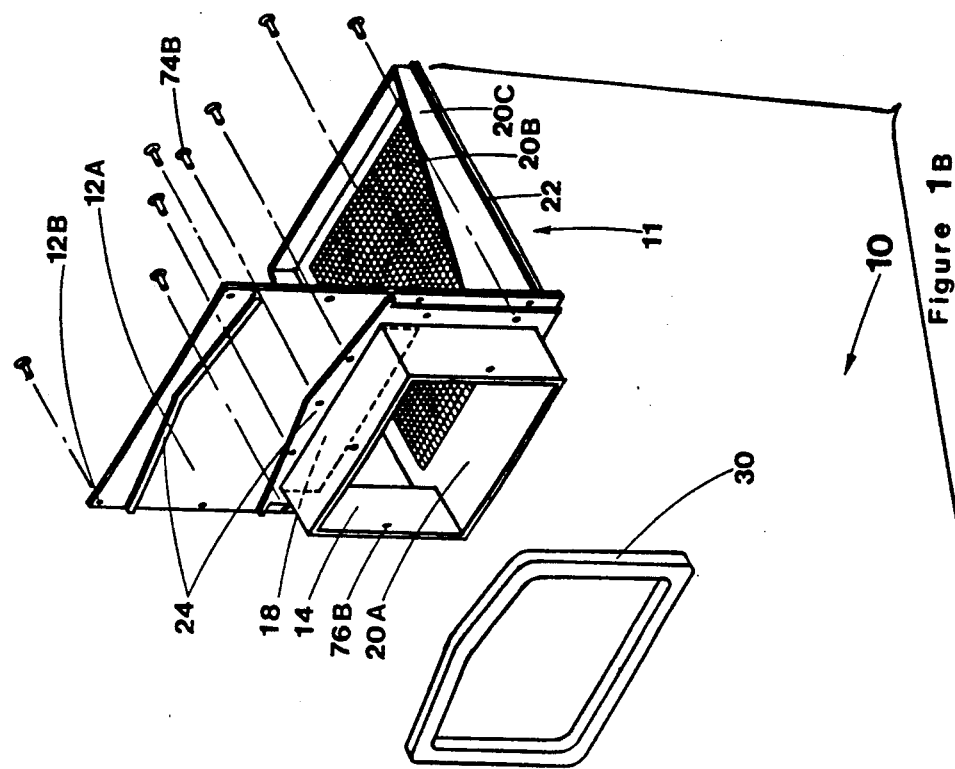
FIG. 1B shows an isometric assembly of a similar support boot and security sleeve, viewed from a dwelling interior, illustrative of an enclosure installation in a typical pre-existing frame opening.
Figure 1B:
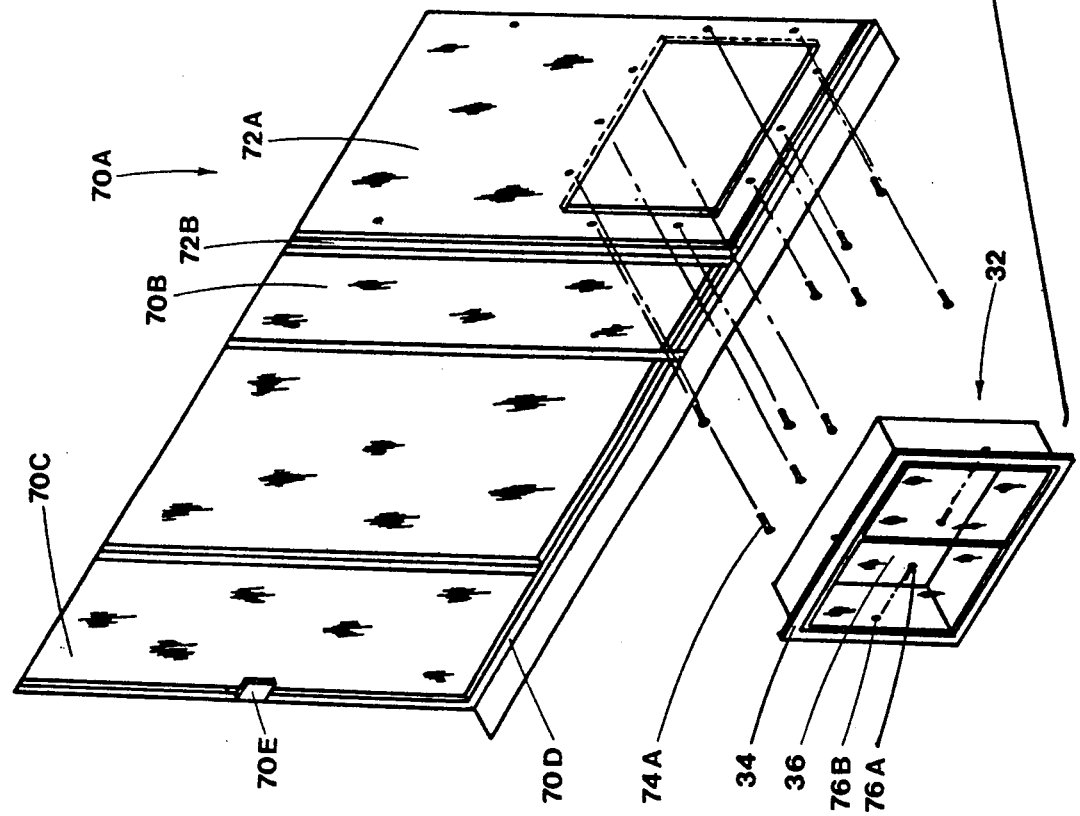

A typical embodiment of the space addition enclosure of the present invention is illustrated in FIGS. 1A, 1B, 2A, 2B, 3, and 4. The assembled device is generally designated by the reference numeral 10.

The enclosure 10 is an assemblage of a componential nature, with most parts fabricated of varying plastic composites. Clearly, any material that improves the durability and strength, along with a weight and cost reduction, is contemplated by this invention. As will become more evident from the descriptions herein, each part may be made from varying materials, each of which is most advantageously suited to its functional requirements.

Figure 2A:
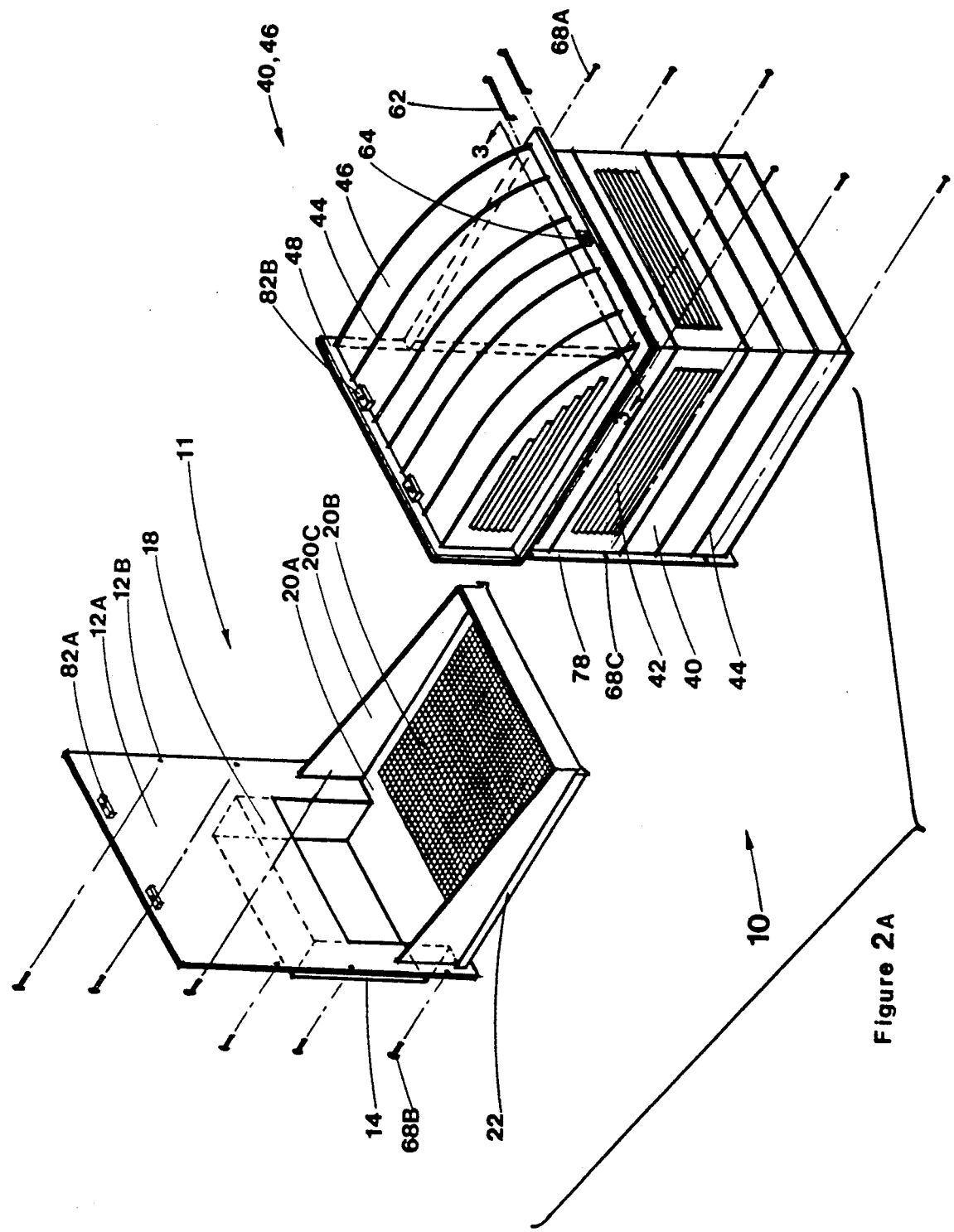
FIG. 2A shows an isometric assembly, viewed from a dwelling exterior, of a support boot and an enclosure body that is illustrative of device Embodiment A, for holding a pet litter tray or other stored contents.
Figure 2B:
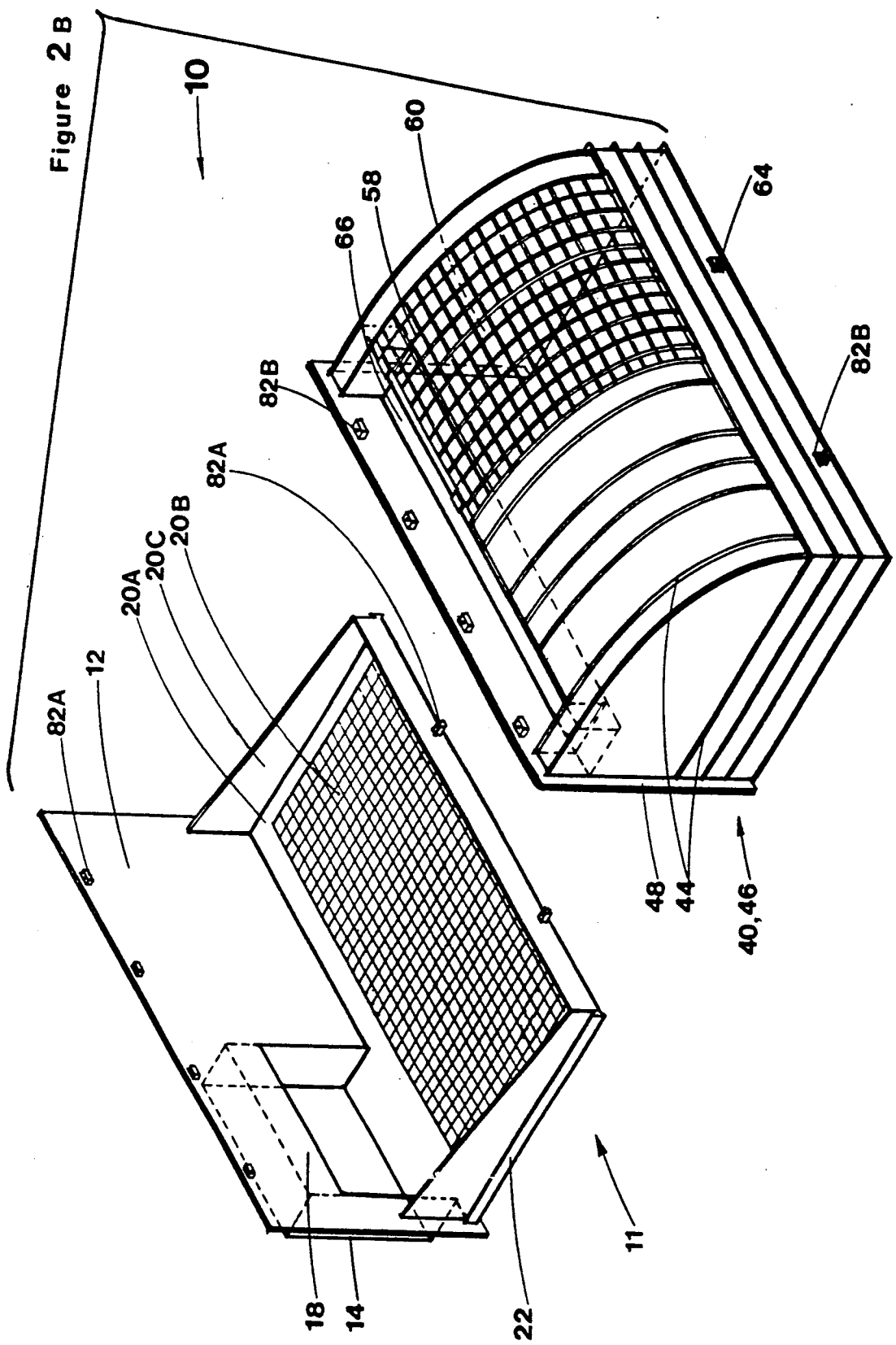
FIG. 2B shows an isometric assembly, viewed from a dwelling exterior, of a similar support boot and different enclosure body that is illustrative of device Embodiment B, for general use pet lounging and pet perching.

For example, as shown in FIGS. 1A and 1B, the support boot 11 and security sleeve 32 are made of a rigid plastic, preferably PVC or ABS. Any number of structure grade plastics may be used which have the following characteristics: a structural capacity to facilitate a self-buttressing, cantilevered, weight bearing arrangement between the elements of device restraint and device support; resistance to cleaning solvents and odor absorption; ability to be tooled to accommodate and support connective devices; ability to be molded to form a grated floor 20 which is strong enough to support requisite loads, and otherwise is of a substantially open-grid configuration to allow maximum air circulation; and finally, sufficient impact strength to comprise a security plate 18 that resists ready removal and tampering. As shown in FIGS. 2A and 2B, an enclosure body 40 and enclosure roof 46 are fabricated from a plastic material which has the properties of being sufficiently pliable so as to resist cracking and checking from sunlight induced heat exposure, and further includes ultra-violet blocking agents to prevent damage from sun exposure. Additionally, this material may have translucent qualities for sunlight illumination of the interior of the enclosure.

As shown in FIGS. 1A and 1B, the support boot 11 comprises a ventilating floor base 20A. This floor base 20A is comprised of an open grated, floor grid 20B and perimeter vertical floor rails 20C of sufficient thickness and height to assistively support the floor grid in a cantilevered configuration. Alternatively, the height of the floor rails 20C may be altered accordingly, or even eliminated, dependent upon the characteristic strength of the material employed in the support boot 11 fabrication. Laterally transversing the outer perimeter sides of the floor rails 20C are protruding ribs 22, having an outwardly flared configuration which interconnect with the complimentary-mated channels 54 in the enclosure body 40. The cross-sectional shapes of these ribs 22, and corresponding channels 54, can be altered to suit various functional and fabricating concerns, whereby the alternate shapes critically provide for an interconnecting and interlocking configuration which resists lateral forces applied from within the enclosure body 40. The grated floor grid 20B has rectangular openings therein approximately 1.5 cm square. The shape and size of these openings may vary according to the varied functional use of the device and the characteristic strength of the employed material. The approximate width and length of the floor base 20A are, respectively, 45 cm × 55 cm.

Adjoined to one end of the floor base 20A is a vertical wall transfer plate 12A. The approximate width and height of this wall transfer plate 12A shown in FIG. 1A are, respectively, 51 cm × 62.5 cm. As shown in the preferred embodiments, the generally planar and otherwise uniform surface of the wall transfer plate 12A, on the side that abuts the dwelling wall 28B or mounting panel 72A, may additionally have one or more diverter protrusions 24 formed thereon. This diverter protrusion 24, as characterized in this embodiment, is generally shaped as an upwardly turned channel which laterally transverses the planar surface of the abutted wall transfer plate 12A and gradually slopes downwardly from the center toward the outer side perimeters of the wall transfer plate 12A. This allows any moisture which enters the void area between the dwelling wall surface 28B and the wall transfer plate 12A to drain to the outer, side extremities of a service opening 28A, rather than accumulate at the top area of a mounting sleeve 14, which penetrates the dwelling wall. Furthermore, the combination of the diverter protrusion 24 and a gasket seal 30 creates a ventilating space between the wall transfer plate 12A and the exterior dwelling wall surface 28B, thereby preventing subsequent moisture instigated property damage. Clearly, other configurations of the diverter protrusion, which helps to position a gasket seal and prevent standing water, can be utilized.

The wall transfer plate 12A further includes a plurality of holes, approximately 1.3 cm diameter, along the side perimeter edges, which receive enclosure body fasteners 68A and enclosure body fastener studs 68B. These wall holes 12B may further receive mounting panel installation fasteners 74A and mounting panel installation studs 74B in the case of the Embodiment shown in FIG. 1B. These holes 12B may alternatively be machine threaded to eliminate the use of the fastener studs 68B and 74B.

The enclosure body fasteners 68A and mounting panel installation fasteners 74A are made of a typical and conventional machine threaded, round headed, phillips driven, cadmium plated metallic material. Clearly, any other plastic and corrosive resistant type material or conventional type fastener device can be substituted.

Integrally attached to and protruding from the wall transfer plate 12A, on the side opposing the floor base 20A, is a rectangular-shaped, hollow mounting sleeve 14 generally comprised of two side walls, adjoined by top and bottom walls, and being open at both ends. The approximate width, height, and depth of this mounting sleeve 14 are respectively 36 cm, 32 cm, and 10 cm. The width of 36 cm is explicitly specified so as to allow a ready and unobstructed device installation within the space between the pre-existing, standardly spaced dwelling wall studs 28A of 16 inches on center. The side walls therein contain 1.3 cm diameter holes 26B to receive conventionally available 0.6 cm × 5 cm screw-type fasteners referenced as wall installation fasteners 26A which attach to the adjacent vertical wall members or studs 28A. The bottom surface of the mounting sleeve 14 generally aligns in planar fashion with the adjoining surface of the floor base 20A. The bottom and the top walls of the mounting sleeve may have a length equal to or lesser than the side walls.

Protruding partially downwardly into the mounting sleeve 14 is an integrally-attached, generally planar security plate 18. The security plate 18 infringes into the enclosed area of the mounting sleeve so as to diminish the respective cross-sectional area of the mounting sleeve about the security plate 18 to a nominal dimension so as to limit human passage therethrough a restricted access area.

A compressible gasket seal 30, of a nominal thickness installed in an encircling fashion around the service opening 28A and the mounting sleeve 14, so as to conformingly fill any irregular and varied surface voids in the exterior wall 28B surface. Additionally, the gasket seal 30 is formed in a shape corresponding to the outer perimeters of the diverter protrusion 24 and the mounting sleeve 14. This serves to fixedly position the gasket about the opening. The gasket seal 30 cross-sectional diameter may be approximately 1.3 cm to 3 cm, dependent upon the characteristic compressibility of the material employed.

A rectangular-shaped, hollow security sleeve 32 is engaged, in a close-fitted fashion, into the hollow mounting sleeve 14. The ensuing enclosed area therein constitutes a service access areaway. The approximate width, height, and depth of this security sleeve 32 are, respectively, 32.5 cm, 30 cm and 10 cm. This security sleeve 32 is generally comprised of two side walls adjoined by connecting top and bottom walls, and is open at both ends. The height of the service access areaway is of a nominal dimension large enough to allow a pair of service access doors 36 to be operably mounted therein. The service access doors 36 generally comprise a pivotally operable edge, an air infiltration seal, and a self-closing mechanism. The side walls of the security sleeve 32 are of sufficient depth so as to be capable of covering and concealing the wall installation fasteners 26A, thereby dissuading a malicious attempt by an outside intruder to de-install the support boot 11 and thereby gain access to the dwelling through the service opening 28A. The bottom and the top walls of the security sleeve 32 may be of equal or lesser depth than the side walls. Additionally, the security sleeve 32 comprises a mounting flange 34 disposed at the open end least proximate to the support boot 11, and having an adjoined surface projecting laterally outward and mounting flush against the front surface 28C of the dwelling wall. The side portions of this retaining flange 34 have a plurality of fastener holes 38B therein for mounting typical and conventionally available security fastener devices 38A to the pre-aligned structural wall members 28A. These security fasteners 38A are such that they discourage the de-installation of the security sleeve 32 and prohibit dwelling access to malicious, outside intruders.

As an alternate method of device 10 installation to the previously described dwelling wall mounting, FIG. 1B shows the support boot 11 flexibly and readily installed in a mounting panel 72A within a pre-existing sliding, window/door opening 70A. Clearly, this installation method is suitable to any variety of other pre-existing frame openings. In this illustrated embodiment, the fixed window panel 70B, and accompanying latching device 70E, are repositioned to provide an opening for the mounting panel 72A, and thereby allows continued use of the sliding window panel 70C. This mounting panel 72A is fabricated of a translucent and transparent plastic such as PLEXIGLAS, a registered trademark; and further includes a plastic mounting panel frame 72B of a nominal dimensional width and depth that is readily adapted for placement into the pre-existing receiving track of a conventionally fabricated window frame 70D. The support boot 11 is attached to the mounting panel 72A with a plurality of interiorly installed mounting panel installation fasteners 74A. These fasteners 74A are comprised of a conventionally available, round head, machine thread screws, or plastic equivalent, in combination with a matching plurality of exteriorly-inserted, receptively-mated mounting panel installation studs 74B. These studs 74B are fabricated of a machineable plastic and are in the form of a sleeve, having a single open end, internal threads, and a plain-surfaced, convex-shaped retaining head at the end opposite the open end. As alternatively shown in FIG. 1B, rather than the security sleeve 32 being attached to the structural wall members 28A with fasteners 38A [FIG. 1A], sleeve attachment fasteners 76A are used to attach the security sleeve 32 to the mounting sleeve 14. Resultantly, this alternative sleeve connectment provides a supportive, secure, and tamper-resistant installation.

FIGS. 2A and 2B depict varying Embodiments A and B of preferred enclosure body 40 and enclosure roof 46 configuration. As will become more evident, the interchangeable and adaptable features of each embodiment are suited to an expanded range of functional uses and adaptable to varying environmental conditions. For example, the waterproof and removable roof enclosure 46 of Embodiment A is advantageously intended to adequately shelter the contents contained therein; whereas contrastingly, the accessible open-grated roof opening of Embodiment B is specifically unconcerned about comprehensibly protecting the interior contents of the enclosure body 40, and is moreso concerned about providing visibility and maximum air and sunlight exposure. Summarily, it is this componential interchangeability and feature flexibility, dependent upon varied application, which enhances the diverse functional use of this enclosure 10.

The preferred embodiments of the enclosure body 40 include a single end wall with accompanying side walls, an optionally detachable or an integrally attached, sloping enclosure roof 46, and a generally open bottom and absent floor. The open bottom allows the substantially open floor grid 20B of the support boot 11 the ability to cause a dominant convective current of air to effectively circulate in, through, and out of the enclosure 10 interior. The placement of wall apertures 42 in a number of walls, and optional roof openings 58, provide increased ventilation.

The enclosure body 40 and enclosure roof 46, or a combination thereof as shown in FIGS. 2A and 2B, are fabricated from an unspecified plastic material, as previously described. The wall and roof surfaces are molded of generally uniform, planar surfaces with the exception of integrally-formed, protruding ribs 44. These ribs 44 are aligned in a parallel and repetitive fashion, further transversing around the encompassing enclosure walls in a continuous fashion. These outwardly protruding ribs 44, or the inversion thereof, provide added structural strength to an otherwise uninterrupted expansive surface, thereby producing cost savings and material weight reduction.

Figure 3:
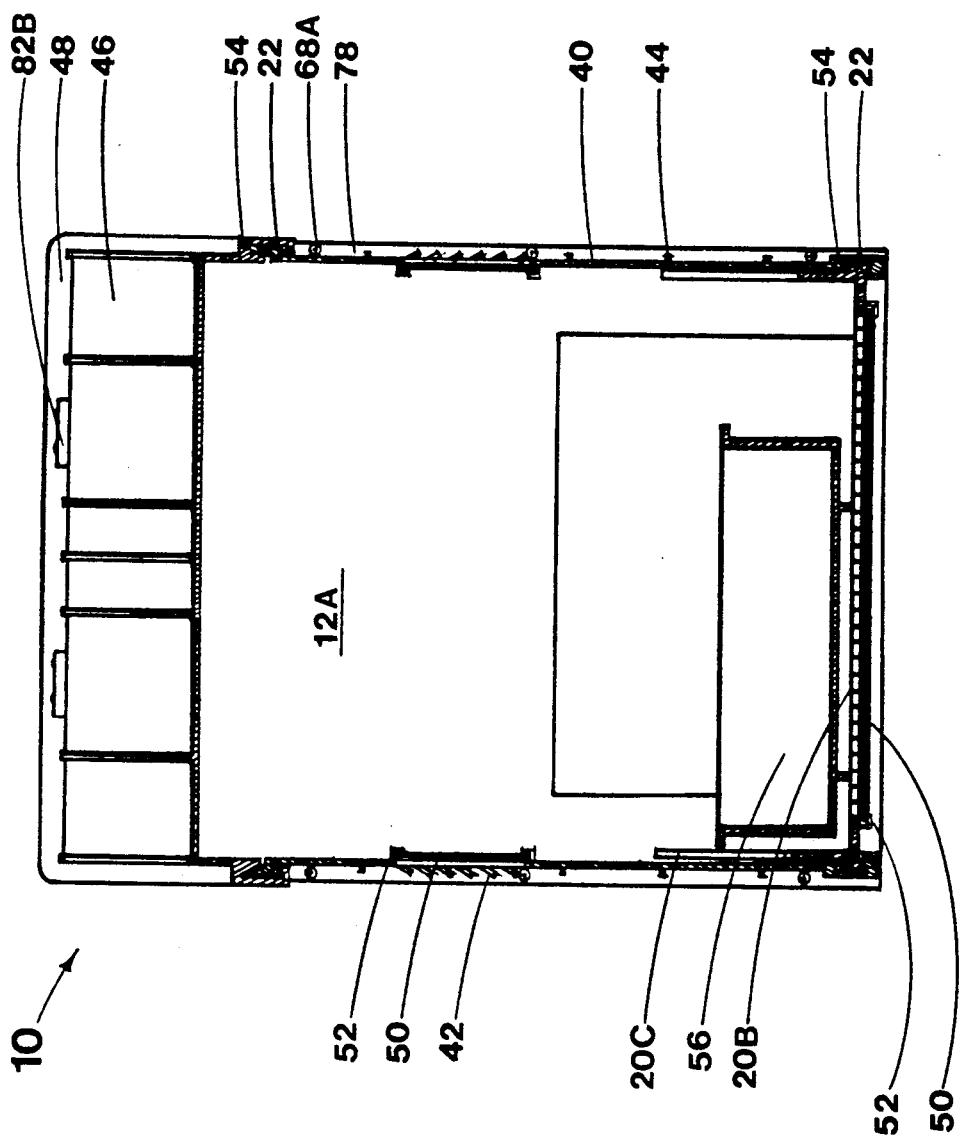
FIG. 3 shows a longitudinal cross section end view of a typical support boot and Embodiment A of an enclosure body, illustrative of an assembly connectment means and a screening material restraining means.

The enclosure roof 46, shown in FIG. 2A, in combination with the enclosure body 40, as shown in FIG. 2A and 2B and more explicitly depicted in FIG. 3, are provided with similar interconnecting assembly means, as those used to connect the support boot 11 and the enclosure body 40, and are comprised of male-mated ribs 22, which are received by and interlock with compatibly female-mated, inwardly-flared channels 54. These connectments laterally transverse the respective upper and lower side walls of the enclosure body 40 and the roof 46. The combination of channels 54 and ribs 22 provide a non-corrosive and readily installed componential assembly.

Additionally shown in FIGS. 2A and 2B are the outwardly-projected, flanged perimeter edges 78 of the enclosure body 40. These flanged edges 78, located at the terminated open ends of the side walls are attached to the wall plate 12A by a plurality of enclosure body fasteners 68A and studs 68B, as previously described. Also shown is a perimeter drip lip 48 located at the uppermost top edges of the enclosure roof 46. This drip lip 48 is generally configured similar to the previously discussed flanged perimeter edge 78, with the further inclusion of an additional returning, protruded surface which wraps around the exposed outer edge surfaces of the adjacent wall plate 12A. This perimeter lip 48 diverts invasive water elements away from the interior of the enclosure 10.

FIGS. 2A and 2B show an interconnecting and aligning means, wherein a plurality of mated pairs of restraining tabs 82A and restraining pockets 82B are located respectively on the wall plate 12A and the enclosure body 40 and enclosure roof 46. These restraining tabs 82A are rectangularly shaped protrusions, although the shape is not critical and may be altered, and further comprise a number of raised-nipple formations on the otherwise, generally regular planar surfaces. The restraining pockets 82B are correspondingly shaped hollow-bodied recessed cavities, and further comprise an equally matching number of indented-nipple formations on the otherwise, generally regular planar mated surfaces. The respective raised-nipple and indented-nipple interlockingly restrain the device against disassembly when inserted and snapped in place.

A security latch 64 is shown in FIGS. 2A and 2B. This element may be fabricated as an integral part of the plastic enclosure parts 40 and 46; or alternately, may be of any other conventionally available type latching mechanism which resists unwanted device 10 disassembly and tampering.

FIG. 3 shows screening materials 50 and screen restraining tabs 52 which protects all vented openings, including the wall apertures 42 and the floor base 20A from insect entry. The tabs 52 of this preferred embodiment are integrally formed as a part of the floor base and walls and comprise a segmented channel. The screening material 50 is slid into the positioning and receiving tab 52, and thereby removably held in place for servicing and replacement.

FIG. 2B further shows an embodiment provided with sections of an open-grated roof 58 and an open-grated wall 60; both of which provide increased air and sunlight. Other alternative features shown within this embodiment include an integrally molded, recessed chamber area 66 within the enclosure body 40 and enclosure roof 46 for holding organic plants as well as possibly feeding and watering materials.

FIG. 4 shows a service opening 28A provided with cover plates 80A and 80B applied in concurrent fashion from interiorly and exteriorly of the dwelling wall 28C and 28B. Cover plate fasteners 80C and gasket material 30A are respectively employed from the interior and exterior of same dwelling wall, thereby securing the opening 28A and obviating the need for wall patching in the event of either temporary or permanent removal of the enclosure.

FIG. 2A shows a pair of holding arms 62 pivotally attached to the enclosure body 40. These holding arms 62 are made of a corrosion-resistant material and are generally of an extending bar shape. The otherwise uniform surface of the arm 62 is interrupted by protruding, up-turned and down-turned portions at the ends thereof. When in the extended position, these holding arms 62 permit a disposal bag to be positioned in an open position thereon, so as to allow for hands-free servicing of the enclosure contents. When in the retracted position, the arms are aligned parallel to the adjacent wall of the enclosure body 40.

Upon review of the above description and illustrations, which are representative of a preferred embodiment of the invention in a particular specificity, it should be understood that many variations and modifications thereto are possible, all of which fall within the spirit and scope of this invention as defined in the Appended Claims and their legal equivalents.

What is claimed is:

1. A dwelling addition pet enclosure comprising:
 a) a support boot supported within an opening in a wall of a dwelling and attached thereto; said support boot comprising a generally planar floor base having front, rear and side edges, said floor base having a first ventilation means therein; a substantially planar wall transfer plate, said wall transfer plate having an inner side and an outer side, said floor base being attached along the front edge thereof to the inner side of said wall transfer plate; an access opening disposed in said wall transfer plate; and a tubular mounting sleeve having open proximal and distal ends, the proximal end of said mounting sleeve being attached to the outer side of said wall transfer plate, said mounting sleeve being aligned with said access opening;
 b) sealing means disposed between said wall transfer plate and the dwelling wall for forming a watertight seal therewith;
 c) a tubular security sleeve having open proximal and distal ends, said security sleeve being sized and configured to be matingly received within said mounting sleeve, the distal end of said security sleeve having an outwardly extending flange disposed thereon;
 d) door means operably closing the distal end of said security sleeve;
 f) an enclosure body having vertical rear and side walls, an open bottom and an open front;
 g) means for securing said enclosure body to said support boot;
 h) a roof disposed on said enclosure body; and
 i) second ventilation means in at least one of said roof, said rear wall and said side walls; whereby,
 said enclosure body, said roof, and said support boot cooperatively form an enclosed space with said wall mounting plate closing off the front of said enclosure body and said floor base closing off the open bottom of said enclosure body; and whereby said mounting sleeve is mounted within the dwelling wall opening with said wall transfer plate disposed adjacent an exterior surface of the dwelling wall, such that said enclosure body is disposed exteriorly of the dwelling; and the open proximal end of said security sleeve is received within the open distal end of said mounting sleeve with said flange disposed about the dwelling wall opening and mounted to an interior surface of the wall.

2. The enclosure, as defined in claim 1, further comprising:
 a generally planar security plate disposed in and partially blocking said access opening so as to diminish the cross-sectional area thereof, thereby acting as a security barrier to restrict passage into or out of the dwelling through said access opening.

3. The enclosure, as defined in claim 1, wherein said sealing means comprises a gasket seal encircling said mounting sleeve adjacent the proximal end thereof.

4. The enclosure, as defined in claim 1, further comprising:
 at least one diverter protrusion attached to and laterally traversing the outer side of said wall transfer plate for directing any moisture which accumulates between the dwelling wall and the wall transfer plate away from the service opening.

5. The enclosure, as defined in claim 1, wherein said roof is fixedly secured to said enclosure body.

6. The enclosure, as defined in claim 1, wherein said roof is releasably secured to said enclosure body.

7. The enclosure, as defined in claim 1, wherein said second ventilation means is disposed in at least one of said rear wall and said side wall.

8. The enclosure, as defined in claim 8, wherein said second ventilation means comprises partially open louvered apertures so as to divert inclement elements exteriorly of said enclosure body.

9. The enclosure, as defined in claim 1, further comprising screening means disposed over said first and second ventilation means so as to prevent insect penetration therethrough.

10. The enclosure, as defined in claim 9, wherein said screening means comprises a mesh screen and a perimetrically disposed frame encircling said screen; said frame being held in place over said first and second ventilation means by screen positioning tabs such that said screening means is removable for servicing and replacement.

11. The enclosure, as defined in claim 1, wherein said means for securing said enclosure body to said support boot comprises ribs formed on one of said enclosure body and said support boot and corresponding channels on the other of said enclosure body and said support boot which receive said ribs.

12. The enclosure, as defined in claim 1, wherein said support boot, said security sleeve, said enclosure body, and said roof are constructed of molded plastic material.

13. The enclosure, as defined in claim 1, wherein said support boot further comprises restraining tabs protruding from the inner side of said wall transfer plate; and said enclosure body and said roof have corresponding pockets which receive said tabs, thereby positioning and releasably securing said enclosure body and said roof to said wall transfer plate.

14. The enclosure, as defined in claim 1, wherein said roof includes an integrally formed recessed area having a closed bottom, upstanding sidewalls and an open top.

15. The enclosure, as defined in claim 1, wherein at least a portion of said roof comprises an open grated roof.

16. The enclosure, as defined in claim 1, further comprising a removable litter tray disposed in the enclosed space formed by said roof, said enclosure body, said floor base and said wall transfer plate.

17. The enclosure, as defined in claim 16, further comprising means for holding a waste disposal bag in an open condition, said bag holding means being attached to, and disposed exteriorly of, said enclosure body.

18. The enclosure, as defined in claim 17, wherein said bag holding means comprises a pair of horizontally extending mounting arms pivotally attached to said enclosure body, said arms being pivotable between a retracted position wherein said arms lie parallel to and adjacent said enclosure body and an extended position wherein said arms extend outwardly from the enclosure body for receiving a waste disposal bag in an open configuration.

19. A dwelling addition pet enclosure system comprising in combination:
   a) an enclosure member, said enclosure member comprising:
      i) a support boot within an opening in a wall of a dwelling and attached thereto; said support boot comprising a generally planar floor base having front, rear and side edges; said floor base having a first ventilation means therein; a substantially planar wall transfer plate, said wall transfer plate having an inner side and an outer side, said floor base being attached along the front edge thereof to the inner side of said wall transfer plate; an access opening disposed in said wall transfer plate; and a tubular mounting sleeve having open proximal and distal ends, the proximal end of said mounting sleeve being attached to the outer side of said wall transfer plate, said mounting sleeve being aligned with said access opening;
      ii) A tubular security sleeve having open proximal and distal ends, said security sleeve being sized and configured to be matingly received within said mounting sleeve, the distal end of said security sleeve having an outwardly extending flange disposed thereon;
      iii) a door means operably closing the distal end of said security sleeve;
      iv) an enclosure body having vertical rear and side walls, an open bottom and an open front;
      v) means for securing said enclosure body to said support boot;
      vi) a roof disposed on said enclosure body; and
      vii) second ventilation means in at least one of said roof, said rear wall, and said side walls;
   b) a pair of substantially planar cover plates, each of said cover plates being sized and configured to substantially cover the dwelling wall opening; and
   c) sealing means for forming a water-tight seal between the dwelling wall and one of said wall transfer plate and one of said cover plates;
whereby, when said enclosure member is installed in the dwelling wall opening, said mounting sleeve is mounted within the dwelling wall opening with said wall transfer plate disposed adjacent an exterior surface of the dwelling wall, such that said enclosure body is disposed exteriorly of the dwelling; said sealing means is disposed between said wall transfer plate and the exterior surface of the dwelling wall; the open proximal end of said security sleeve is received within the open distal end of said mounting sleeve with said flange disposed about the dwelling wall opening and mounted to an interior surface of the dwelling wall; and said enclosure body, said roof and said support boot cooperatively form an enclosed space with said wall mounting plate closing off the front of said enclosure body and said floor base closing off the open bottom of said enclosure body; and
whereby, when said enclosure member is removed from the dwelling wall opening, said cover plates are installed over the dwelling wall opening, one of said cover plates disposed adjacent the interior surface of the dwelling wall and the other of said cover plates disposed adjacent the exterior surface of the dwelling wall; and said sealing means is disposed between the exterior surface of the dwelling wall and said cover plate disposed adjacent thereto; said cover plates thereby cooperating to completely cover and seal the dwelling wall opening.

* * * * *